Figure 1:
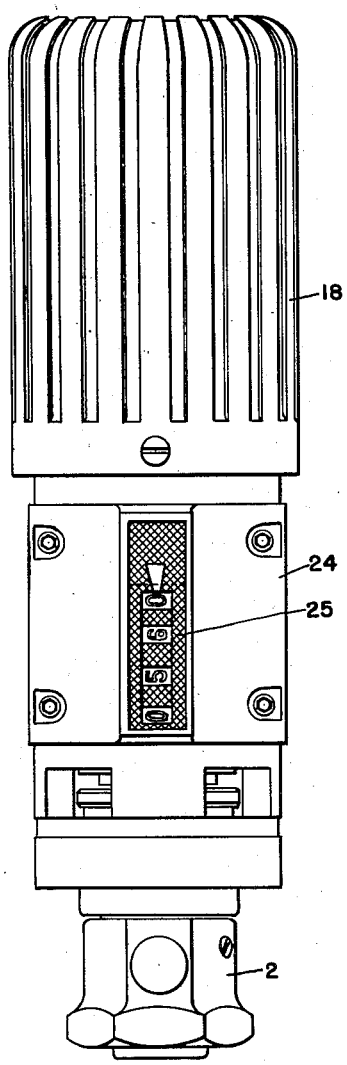

Sept. 16, 1952   J. A. STEIN ET AL   2,610,508
PRESSURE INDICATOR

Filed Oct. 12, 1946   3 Sheets-Sheet 1

INVENTORS
Joseph A. Stein &
John W. Wagner
BY
J. E. Dickinson
ATTORNEY

Sept. 16, 1952    J. A. STEIN ET AL    2,610,508
PRESSURE INDICATOR

Filed Oct. 12, 1946    3 Sheets-Sheet 2

INVENTORS
Joseph A. Stein &
John W. Wagner
BY
J. E. Dickinson
ATTORNEY

Sept. 16, 1952  J. A. STEIN ET AL  2,610,508
PRESSURE INDICATOR
Filed Oct. 12, 1946  3 Sheets-Sheet 3
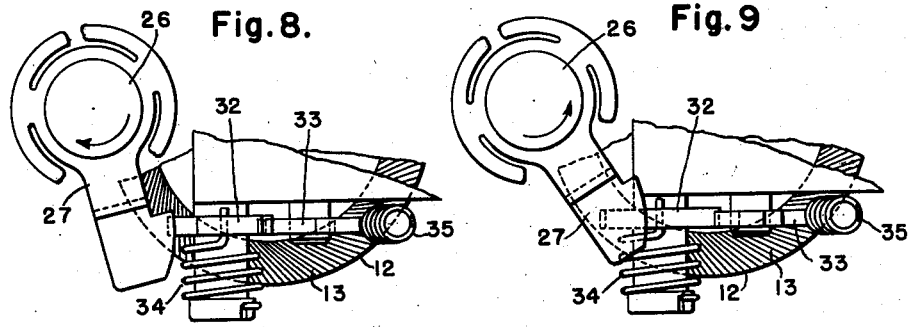
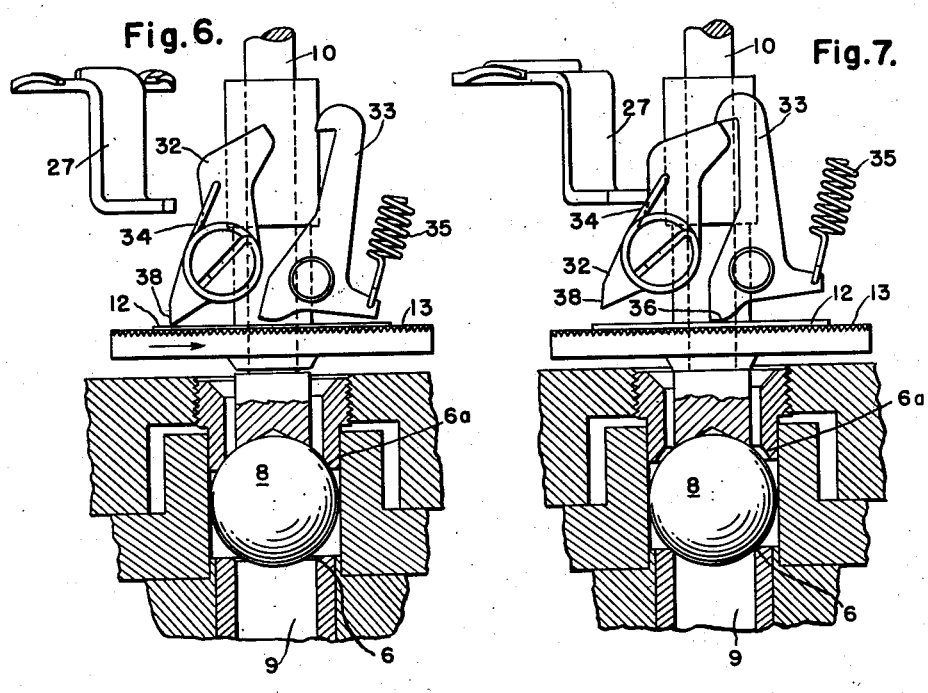
INVENTORS
Joseph A. Stein &
John W. Wagner
BY
J. E. Dickinson
ATTORNEY Patented Sept. 16, 1952

2,610,508

UNITED STATES PATENT OFFICE 2,610,508

PRESSURE INDICATOR

Joseph A. Stein and John W. Wagner, Pittsburgh, Pa., assignors to Bacharach Industrial Instrument Company, Pittsburgh, Pa., a corporation of Pennsylvania Application October 12, 1946, Serial No. 702,944

14 Claims. (Cl. 73—389)

This invention relates to new and useful improvements in pressure gages or indicators for measuring compression and firing pressures occurring in the cylinders of diesel engines or the like at any operating speed, and, while not necessarily so limited, has to do with pressure indicators which utilize a precisely calibrated spring as a force balancing the maximum cylinder pressures, the measured deflection of the spring through suitable indicating means providing a reading of the compression or firing pressure occurring in the cylinders to which the instrument is attached.

Indicators of the above character must function to indicate the peak pressure of the cyclic varying pressure in the engine cylinders, and various means, such as lever devices and illuminating circuits, for indicating when the peak pressure balances the spring pressure of the calibrating device have been heretofore proposed. Such indicating means are actuated and energized at the moment the calibrating device has been adjusted to balance the peak pressure of the engine cylinder. The difficulty with such prior art devices lies in the inability to detect the slight fluctuation of the lever if mechanical, or in the use of cumbersome electrical and auxiliary equipment when illuminating circuits are involved. Another difficulty with such prior art is the tendency to read inaccurately due to the effect of carbonaceous or tarry accumulations from certain engine cylinder gases on certain parts, necessitating frequent cleaning.

The present invention utilizes a pressure responsive device which creates an impulsive force that is utilized to act positively on the instrument to show that the peak cyclic pressure has been balanced and the value of the balanced peak pressure in terms of pounds pressure or otherwise.

It is among the objects of the invention to provide a pressure gage using a piston and cylinder design which, by the provision of a substantial actuating force at the moment the peak cylinder pressure just overbalances the opposing spring pressure, is insensitive in its accuracy response to the effect of carbonaceous or tarry deposits accumulating from certain engine cylinder gases, requiring only infrequent cleaning or no cleaning at all.

It is another object of the invention to provide a pressure gage, the readings of which are free of inertia errors.

It is a further object of the invention to provide a pressure gage utilizing a single hand adjusting means for obtaining a positive reading independent of the observer of the peak cyclically varying pressures and for resetting the instrument after such reading is taken.

It is still another object of the invention to provide a pressure gage of the above designated character in which changes in the calibrated spring can be determined by a direct reading on the instrument to make necessary corrections in the pressure readings obtained.

Still a further object of the invention is the provision of a pressure gage of the character herein described which utilizes a piston subject to a substantial force increment at the pressure balance point that is counteracted by a calibrated spring and is restricted in its movement to eliminate wear and in response to movement of which portions of the instrument or gage are subjected to accelerated movement to actuate a locking or signalling mechanism that determines the position of the manual adjusting device at which the pressure reading should be taken.

Figure 2:
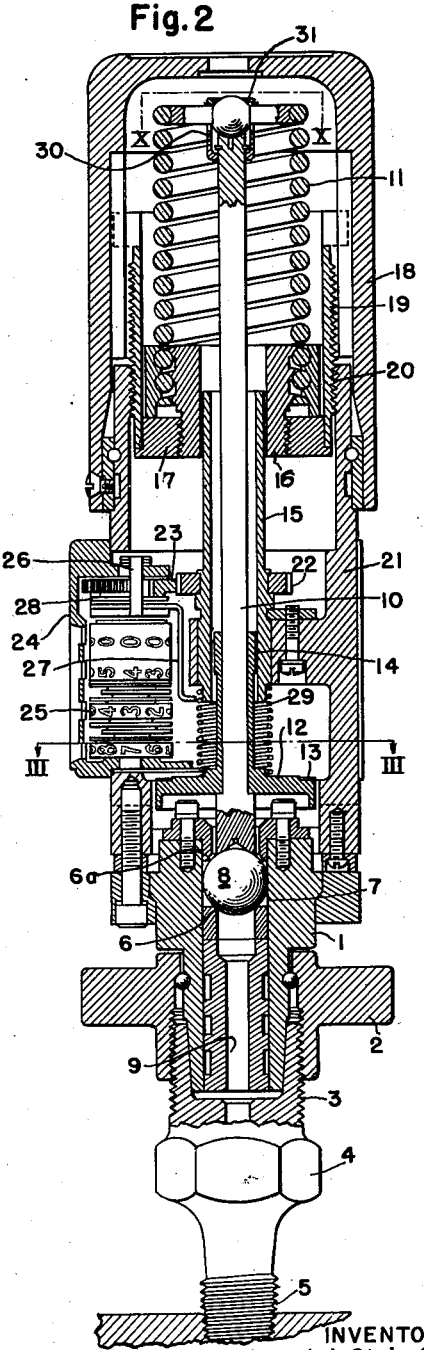
Figure 10:
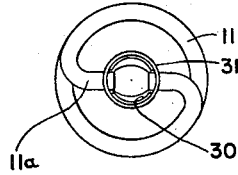
Figure 3:
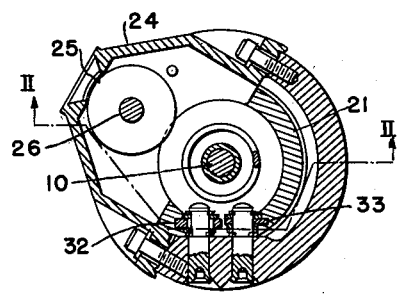
Figure 4:
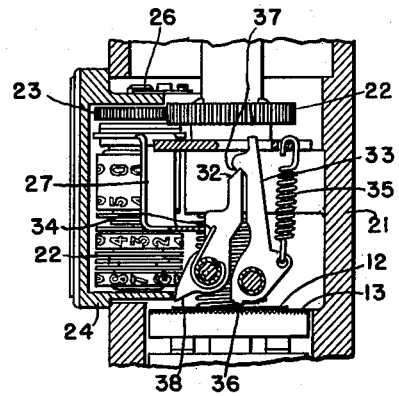
Figure 5:
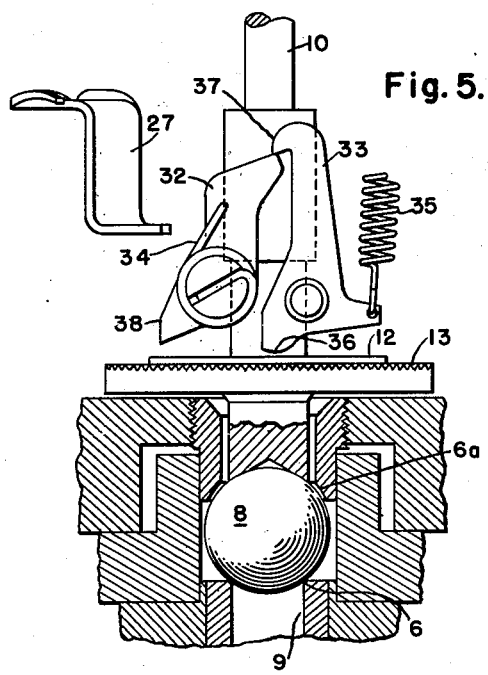

These and other objects of the invention will become more apparent from a consideration of the accompanying drawings, constituting a part hereof, in which like reference characters designate like parts, and in which:

Fig. 1 is a side elevational view of a pressure gage embodying the principles of this invention;

Fig. 2 a vertical cross-sectional view thereof including an adaptor for connecting the instrument to an engine cylinder;

Fig. 3 a cross-sectional view taken along the line III—III, Fig. 2;

Fig. 4 a vertical section, partially in elevation, of a portion of the counter and reset mechanism;

Figs. 5, 6, and 7 vertical cross-sectional views of the piston and contiguous parts, the locking and the reset mechanism illustrating different positions during the operation of the gage;

Figs. 8 and 9 top plan views, respectively, of the countershaft and reset mechanism with portions of the adjacent parts of the instrument as will be hereinafter described, and Fig. 10 is an end view of the spring taken along the line X—X of Fig. 2.

With reference to Figs. 1 to 4 and 10 of the drawings, the structure therein illustrated comprises a body 1 having a wing nut 2 by which it is screwed to the thread 3 of an adapter plug 4 that has a threaded portion 5 for screwing into the wall of an engine cylinder, the compression or firing pressures of which it is desired to measure. The body 1 contains a lower seat 6 and a cylindrical section 7 in which a piston 8 operates. A gas passage 9 is provided in the lower part of the body 1 to permit engine cylinder gases to exert pressure on the underside of piston 8. The piston movement is limited by a top seat 6a and a pusher rod 10 bears on the piston 8, the pusher rod being biased by a calibrated double helical spring 11. A deflector plate 12, so called because it deflects such engine cylinder gases as may leak by piston 8 away from other parts of the instrument, is mounted for rotary and sliding movement on the pusher rod 10 and is provided with serrations or teeth 13. The deflector plate is provided with a shank 14 having spline connections to be rotatable with a hollow drive shaft 15 but is freely movable coaxially on the pusher rod. The drive shaft 15 similarly has a spline connection at 16 with a spring foot 17 and is likewise slidable coaxially relative to the spring foot. The spring foot and drive shaft, as well as the deflector plate, are rotatable by a handle 18 which rotates a spring sleeve 19 that may be formed integrally with or joined to the spring foot and which interacts with threads 20 of a barrel 21, so that when the handle 18 is revolved the spring foot is moved axially to shorten or lengthen the spring 11 to thereby vary the pressure or force on pusher rod 10 and consequently against the piston 8.

A gear wheel 22 is mounted for rotation with the drive shaft 15 and interacts with the teeth of the gear wheel 23 of a counter mechanism mounted in a housing 24 that is attached to the barrel 21. Counters 25 are contained within the housing 24 and are operated by a countershaft 26 which revolves with gear wheels 22 and 23. A reset device 27 is frictionally engaged at 28 with the countershaft to be operated thereby, and a light coil spring 29 is seated on the deflector plate 12 and abuts against the shoulder on the drive shaft 15 to exert only sufficient pressure on the deflector plate to bias it normally in a downward direction to restrain plate 12 against displacement where the gage is used in a position other than the vertical as shown in the drawing.

At the top of the pusher rod 10 a sleeve 30 is provided, it being shaped to pass around the cross wire 11a of the spring 11 and is retained from dropping down by a snap ring 31. This assembly is employed in checking the calibration of the instrument as will be hereinafter described.

With reference to Figs. 3 and 4 of the drawing, the deflector plate 12 is shown in the barrel 21 and a latch 32 and trigger 33, biased by springs 34 and 35, respectively, are pivotally mounted within the barrel 21 above the teeth 13 of the deflector plate. As shown in Fig. 4, vertical movement in an upward direction of the deflector plate 12 would bring it into engagement with the tip 36 of the trigger 33 which would release lock 37 from the latch 32 and spring 34 of the latter would effect engagement of the dog 38 of the latch with the teeth 13 of the deflector plate, thus locking it in position.

The arrangement of the trigger, latch, deflector plate and reset mechanism is more clearly shown in Figs. 5 to 9 of the drawings, wherein the reset mechanism 27 is shown out of engagement with the latch 32 in Figs. 5 and 6 and in engagement to reset the latch and trigger in Fig. 7 of the drawings. In Fig. 8 the relation of the countershaft 26, reset mechanism 27 and the latch and trigger 32 and 33 is shown with reference to the deflector plate 12 as a top plan view, and the function of the latch and reset mechanism will be more fully described in connection with a description of the operation of the entire instrument, which is as follows.

Assuming the adapter 4 to be screwed into the opening of an engine cylinder, as shown in Fig. 2, the handle 18 is turned clockwise to screw down spring foot 17 so as to stretch or lengthen the calibrated spring 11 and load the piston 8 to a force in excess of the peak of the cyclic gas pressure force, expected in the engine cylinder. Spring foot 17 is then slowly backed off by rotating handle 18 in a counter-clockwise direction to reduce the spring load on piston 8. Since the counter-clockwise direction of rotation of the handle 18 will effect a corresponding rotation of drive shaft 15, the gear wheel 23 of the counter mechanism will rotate in a clockwise direction. This direction of rotation moves the reset arm 27 away from the latch 32. The instrument is then ready to take a reading and as slow rotation of the handle 18 in a counter-clockwise direction is continued a loading on the piston 8 is reached at which the peak cylinder pressure force just exceeds the force of spring 11 on piston 8 and the latter is impelled sharply upward, displacing pusher rod 10 upward with it. As soon as the piston 8 moves upward the slightest degree off its seat 6, the entire lower area of the piston is exposed to the cylinder pressure resulting in a large increase in the force acting on the piston, causing it to move upward very rapidly to its upper seat 6a. Between the time the piston 8 leaves its seat 6 and engages its seat 6a the gases from the engine pass by the piston and impinge against the deflector plate 12, assisting in speeding the upward movement of the deflector plate. When the piston 8 engages its upper seat 6a, it prevents any further passage of the hot engine gases through the indicator and protects the indicator parts from the destructive action of the gases. Since the shoulder of the pusher rod 10 engages the deflector plate 12, the latter will travel upward with it and due to the inertia will overtravel, thereby engaging the tip 36 of the trigger 33 which releases latch 32. This condition is shown in Fig. 6 of the drawings.

Immediately following the piston movement, the cyclically varying pressure in the engine cylinder drops below the force of spring 11 and the deflector plate 12 and pusher rod 10 drop down to the position shown in Fig. 5 of the drawings. Released latch 32 effects engagement of the dog tooth 38 with the teeth 13 of the deflector plate 12, and as rotation of the handle 18 is continued in a counterclockwise direction, the deflector plate 12 tends to pull the latch around with it, further rotating the latch and exerting a downward force on piston 8 through the pusher rod 10 and deflector plate until the piston is firmly locked on its lower seat 6. This locking prevents further rotation of the drive shaft 15, spring foot 17, spring sleeve 19 and handle 18, which indicates to the operator that the peak pressure has been registered on the counter and a reading is then taken of the gas pressure in the engine cylinder at which the piston moved.

After the reading is taken the instrument may be prepared for another reading by first reloading the piston by rotating handle 18 in a clockwise direction to increase the force of spring 11. This clockwise rotation of the handle and, through it, rotation of the drive shaft 15, results in a counter-clockwise rotation of the countershaft 26 and reset arm 27. The reset arm, which is frictionally driven by the countershaft 26, rotates with the countershaft until the end of the reset arm engages latch 32, as shown in Figs. 7, 8 and 9 of the drawings, rotating the latch in a clockwise direction and pushing the trigger 33 to one side until it is in position to catch on the latch. Reverse rotation of the handle 18 will then result in displacement of the reset arm away from the latch and the instrument is in readiness for another reading in the manner as heretofore described.

It is well known that springs, like spring 11, tend to creep or elongate slightly under continuous and repeated loading. The creep is a function of load, time at load and temperature, and is kept to a minimum by careful design. However, after prolonged use an instrument spring will show some change in length and for maximum accuracy of reading correction for the change may be required. Provision is made to check the spring length of the instrument through the sleeve 30 at the top of the pusher rod 10. If handle 18 is turned in a counter-clockwise direction the spring will first unload and then pull upward in the instrument. As the top of the spring moves upward a cross wire at the top, which is part of the spring 11, will engage snap ring 31 and lift pusher rod 10 up with it. As the pusher rod is raised deflector plate 12 will also be lifted until the deflector plate contacts trigger 33, releasing latch 32, which will engage the teeth 13 of deflector plate 12 and prevent further rotation of the handle 18. By noting the reading of the counter 25 when the handle locks, a calibration check figure is obtained which may be used to correct the reading for changes in spring length, or in other words, correct the calibration; or this figure may be used to reset the counter to give correct readings. This method of calibration is also employed and the proper counter reading noted on instructions secured to new instruments when tested at the place of manufacture.

It is evident from the foregoing description of this invention that the provision of a positive locking device gives a direct positive indication of the time to read the instrument. It will also be observed that in its locked position latch 32 exerts a downward component of force on deflector plate 12, spring plunger 10 and piston 8, thus greatly reducing the number of piston strokes per reading and thereby preventing excessive lower seat destruction. For this same reason the spacing between ball seat 6 and the upper abutment 6a, permitting piston movement, is very slight. By preventing such destruction a narrower, lower seat may be employed which results in increased instrument accuracy. A narrow seat also results in reduced seat leakage and is self-cleaning. In spite of the small piston travel the provision of a greatly increased piston area on which the engine cylinder pressure acts the instant piston 8 moves infinitesimally off its lower seat 6 provides a great increase of upward force at this critical moment causing an upward impulsive thrust on piston 8 which is of such great magnitude momentarily that the spring plunger 10 carrying deflector plate 12 will be repelled sufficiently to operate the latch and trigger mechanism to lock the handle 18 and the counter device.

The over-travel of the deflector plate as provided by inertia and gas pressure requires less tolerances of adjustment and makes the instrument less critical to manufacturing tolerances. The automatic resetting of the latch mechanism simplifies operation of the instrument and permits a simple method of spring checking for maintenance of calibration and accuracy. The provision of a greatly increased piston area on which the engine cylinder pressure acts the instant piston 8 moves infinitesimally off its lower seat 6 practically eliminates inertia error. Since there would be no inertia error with zero piston movement, it is obvious that the inertia error approaches zero as the piston movement approaches zero.

Other structural and operational advantages will appear obvious to those skilled in the art.

Although one form of the device has been herein illustrated and described, it will be evident that modifications may be made in the details of construction without departing from the principles herein set forth.

We claim:

1. A pressure gage comprising a body having a pressure chamber and a passage adapted for connection to a pressure source, a piston in said chamber blocking said passage, said chamber having a lower and upper seat for limited movement of said piston, spring means for loading said piston with a force opposing the pressure at the pressure source, means for transmitting to said piston the force developed in said spring, pressure indicating means, means for varying the force exerted by said spring means, an actuator engaging said pressure indicating means with said spring force varying means for operating said indicating means upon adjustment of the spring force varying means, and means responsive to a predetermined movement of said piston by the pressure in said pressure chamber for immobilizing said pressure indicating means whereby the pressure indicating means will positively register the pressure exerted on the piston by the pressure source at the time the piston is moved by said pressure.

2. A pressure gage comprising a barrel-shaped housing having a pressure chamber with a gas flow passage leading at one end to a pressure source, a piston in said chamber for sealing the pressure source, spaced seats in said chamber for engaging and limiting the degree of movement of said piston and the passage of gas through the chamber, a plunger resting against the piston, a calibrated spring normally biasing said plunger against said piston, means for shortening or lengthening said spring to vary the force exerted on the piston, pressure indicating means mounted on said barrel having connections with said spring length varying means whereby upon movement of the latter said pressure indicating means will be subjected to movement to indicate the degree of adjustment of the pressure spring, means for releasably locking said spring force varying means against movement and means responsive to movement of said plunger due to the force acting against the piston from the pressure source when the spring has been adjusted to a force below the value of the pressure of the source acting upon the piston to lock the spring shortening and lengthening means to thereby indicate the time for reading of the pressure on the indicating means.

3. A pressure gage comprising a housing, a barrel sleeve mounted for rotation on one end of said housing, a pressure chamber at the other end of said housing adapted for connection to a pressure source, a piston in said chamber a plunger resting on said piston, a calibrated spring connected at one end to the plunger and having a spring foot adapted for axial movement to lengthen or shorten said spring upon rotation of the barrel sleeve, a drive shaft disposed around said plunger having spline connection with said spring foot to be rotated thereby, a deflector plate encircling and movable in one direction by said plunger and having spline connection with said drive shaft for rotation simultaneously therewith, a counter mechanism calibrated to indicate pressure mounted on said housing having a countershaft and having gear tooth engagement with said drive shaft, a latch and trigger mechanism engageable by said deflector plate to lock said plate and its connected drive shaft and barrel sleeve against rotating movement, and a reset mechanism operable by rotation of the countershaft to reset said latch and trigger mechanism to release the deflector plate and its associated rotating parts.

4. A pressure gage comprising a cylindrical housing having a rotatable sleeve at one end thereof, a pressure chamber at the other with a passage connecting the chamber to a source of fluid pressure, a pressure responsive device in said passage, a plunger for loading said device to seal said flow passage, a calibrated spring connected at one end to said plunger having a spring foot connected at its other end, a threaded sleeve for said spring foot being connected to said housing sleeve to be rotated thereby to subject the spring foot to axial movement to thereby vary the length of the plunger spring, a drive shaft rotated by said spring foot, a deflector plate having a sleeve extending into said drive shaft and having spline connection therewith, a spring biasing said deflector plate in a normal downward position, a counter mechanism mounted on said gage housing having gear wheel connection with said drive shaft, a latch operable in response to movement of said pressure responsive device to lock said plate, drive shaft, spring foot and housing sleeve against rotary movement in one direction, and a reset mechanism operable upon reverse movement of the housing sleeve to reset said latch mechanism and release the deflector plate.

5. In a pressure gage in which a pressure responsive device is normally held against a source of fluid pressure by the force of a calibrated spring and released by reducing the spring force below the pressure of the fluid, spring force adjusting means, locking mechanism actuated by movement of the pressure responsive device comprising a deflector plate rotatable by movement of the spring force adjusting means having teeth on one surface thereof, a latch for engaging said teeth to lock said plate, and a trigger for holding and releasing said latch, the trigger being actuated by movement of the deflector plate upon movement of the pressure responsive device to release the latch to thereby lock the spring force adjusting means, and means for resetting said latch and trigger.

6. In a pressure gage for measuring the peak pressure of cyclic varying pressures in the cylinders of engines a chamber having at one end thereof a restricted opening, a pressure responsive element confined within said chamber and adapted normally to seal with a portion of its surface said restricted opening, and a variable resistance means acting upon said element to balance said element against the displacement action of said cylinder pressures, said pressure responsive element uncovering said restricted opening at the instance of unbalance thereby to expose a greater surface area to the engine pressure to accelerate the movement thereof in the direction of the variable resistance means whereby to create an impulse force acting on said pressure responsive element and means responsive to movement of said pressure responsive element for indicating the pressure acting on said pressure responsive element at the instant the pressure in the pressure chamber causes said element to be unseated.

7. In a pressure gage for measuring the peak pressure of a cyclic varying pressure in the cylinders of engines, a pressure responsive element, a spring resisting movement of said pressure responsive element, means for varying the pressure exerted by said spring on said pressure responsive element, pressure indicating means actuated by movement of said spring pressure varying means which designates the value of said spring pressure for any position of said pressure varying means, means operated by movement of said pressure responsive element for locking said pressure varying and said pressure indicating means against further movement to thereby register the value of the unbalancing pressure acting upon said pressure responsive element at the instant of movement of the latter element.

8. In a pressure gage for measuring the peak pressure of a cyclic varying pressure in the cylinders of engines, a pressure responsive element, a spring resisting movement of said pressure responsive element, means for varying the pressure exerted by said spring on said pressure responsive element, indicating means actuated by said spring pressure varying means which designates the value of said spring pressure for any position of said pressure varying means, means responsive to movement of said pressure responsive element for locking said pressure varying and said pressure indicating means against further movement to thereby register the value of the unbalancing pressure acting upon said pressure responsive element at the time of movement, and means for actuating said locking means for said pressure indicating means when the tension in said spring is removed to determine error if any in the length of said spring when unloaded.

9. A pressure gage comprising a body having a pressure chamber and a passage adapted for connection to a pressure source, a pressure responsive spherical member in said chamber blocking said passage, said chamber having a lower seat on which said member normally rests, spring means for loading said member with a force in excess of the pressure source, means for adjustment of the spring force in relation to the upward force due to the pressure source on said member, said member being given an additional force increment through exposure of a greater portion of the surface thereof to the upward force when upward force on said member due to pressure source just exceeds said opposing spring force and pressure indicating means to register pressure exerted on said member when it receives said force increment.

10. A pressure gage comprising a body having a pressure chamber and a passage adapted for connection to a pressure source, a pressure responsive member in said chamber blocking said passage, said chamber having a lower and upper seat for limiting movement of said member, a plunger engaging said member, a calibrated spring connected at one end to said plunger and connected at its other end to a manually adjustable spring foot for lengthening and shortening the spring to vary the force exerted thereby on said plunger, means operable by adjustment of said spring adjusting means for indicating the pressure exerted by said spring on said plunger and means responsive to movement of said plunger for immobilizing said pressure indicating means and for exerting a force on said pressure responsive member blocking off the pressure source to positively maintain said latter member on its lower seat.

11. A pressure gage comprising a body having a cylindrical pressure chamber and a passage adapted for connection to a pressure source, a pressure responsive spherical member in said chamber blocking said passage, said chamber having a lower seat on which said member normally rests, spring means for loading said member with a force in excess of the pressure at the pressure source, pressure indicating means, means for adjustment of the spring force in relation to the upward force due to the pressure source on said member, said member being accelerated upward through exposure of a greater portion of the surface thereof to the upward force when the force on said member due to pressure source just exceeds said opposing spring force and means operated by the increased movement of said member to indicate when said pressure indicating means should be read.

12. A pressure gage comprising a body having a pressure chamber and a passage adapted for connection to a pressure source, a piston in said chamber blocking said passage, said chamber having a lower and upper seat for engaging and limiting movement of said piston, a plunger engaging said piston, a calibrated spring connected at one end to said plunger and connected at its other end to an adjustable spring foot for adjusting said spring and varying the force exerted by said spring upon said plunger, pressure indicating means, means arranged to be operated by said spring foot adjusting means for also adjusting said pressure indicating means, and releasable means for locking said spring foot adjusting means against movement, said piston being so shaped as to provide a greater area thereof being exposed to the pressure source when it is lifted from its seat to thereby accelerate the operation of said plunger and said releasable locking means so that the indicating means will indicate the pressure at the pressure source to which movement of the plunger responds.

13. A pressure gage comprising a body having a pressure chamber and a passage adapted for connection to a pressure source, a piston in said chamber blocking said passage, said chamber having a lower and upper seat for engaging and restricting movement of said piston, a plunger engaging said piston, a calibrated spring connected at one end to said plunger and connected at its other end to an adjustable spring foot for adjusting the tension in the spring thereby varying the force exerted by said spring upon said plunger, pressure indicating means, means arranged to be operated by said spring foot adjusting means for also adjusting said pressure indicating means, releasable means for locking said spring foot adjusting means against movement, said locking means comprising a deflector plate movable on the plunger and rotatable with the spring foot adjusting means, a latch and trigger for locking said deflector plate against rotation, thereby locking said spring foot adjusting means, and a resetting mechanism operable by reverse movement of the spring foot adjusting means to release the latch and reset the locking mechanism, said piston being shaped to expose a greater area thereof to the pressure source when unseated to thereby accelerate the movement of the plunger and the operation of said releasable locking means to more accurately provide for indicating the pressure at the pressure source to which the plunger and piston respond.

14. Apparatus as set forth in claim 13 characterized by the spring pressed plunger that engages the piston having such a connection with the calibrated spring that upon reversal of movement of the adjustable spring foot the spring pressed plunger will actuate the latch and trigger to lock the adjusting mechanism and the indicating means whereby any difference in length of the spring as originally calibrated is determinable by the indicating means.

JOSEPH A. STEIN.
JOHN W. WAGNER.

REFERENCES CITED

The following references are of record in the file of this patent:

UNITED STATES PATENTS

| Number | Name | Date |
| --- | --- | --- |
| 1,161,875 | Morrow | Nov. 30, 1915 |
| 1,467,558 | Okill | Sept. 11, 1923 |
| 2,046,801 | Ulrich | July 7, 1936 |
| 2,130,649 | Okill | Sept. 20, 1938 |